United States Patent [19]

Muraishi et al.

[11] 4,101,169
[45] Jul. 18, 1978

[54] ADJUSTABLE SEAT FOR A MOTOR VEHICLE

[75] Inventors: Masakazu Muraishi, Higashi-murayama; Takao Sekino, Hiratsuka, both of Japan

[73] Assignee: Nissan Motor Company, Limited, Yokohama, Japan

[21] Appl. No.: 771,983

[22] Filed: Feb. 25, 1977

[30] Foreign Application Priority Data

Feb. 27, 1976 [JP] Japan .................................. 51-20794

[51] Int. Cl.² .............................................. B60N 1/04
[52] U.S. Cl. .................................................... 297/341
[58] Field of Search ................ 297/341; 5/44 B, 44 R

[56] References Cited

U.S. PATENT DOCUMENTS

| | | | |
|---|---|---|---|
| 2,618,312 | 11/1952 | Bradley | 297/341 |
| 3,811,726 | 5/1974 | Muraishi et al. | 297/341 |
| 3,853,373 | 12/1974 | Corbett | 297/341 |
| 3,940,182 | 2/1976 | Tamura | 297/341 |

Primary Examiner—Francis K. Zugel
Attorney, Agent, or Firm—Lane, Aitken, Dunner & Ziems

[57] ABSTRACT

A seat structure includes a stationary base member fixed to the vehicle, a movable support member slidable on the stationary base member for carrying a seat cushion with a tiltable set back, seat position memorizing means, seat locking means for locking the movable support member to the stationary base member, biasing means for moving the movable support member in the forward direction of the vehicle when the seat locking means is disengaged, and actuating means for actuating the seat locking means in association with the seat position memorizing means in response to the tilting movements of the seat back. The actuating means functions in such a manner that when the seatback is forwardly tilted at a predetermined angle, the seat locking means is disengaged thus causing automatic forward movement of the movable support member to permit easy ingress and egress of the rearseat passengers and when the seatback is backward tilted to its normal position while forcing the seat cushion backward, the movable support member is moved backward against the force generated by the biasing means and is finally locked in its initially set position which is memorized by the seat position memorizing means.

7 Claims, 9 Drawing Figures

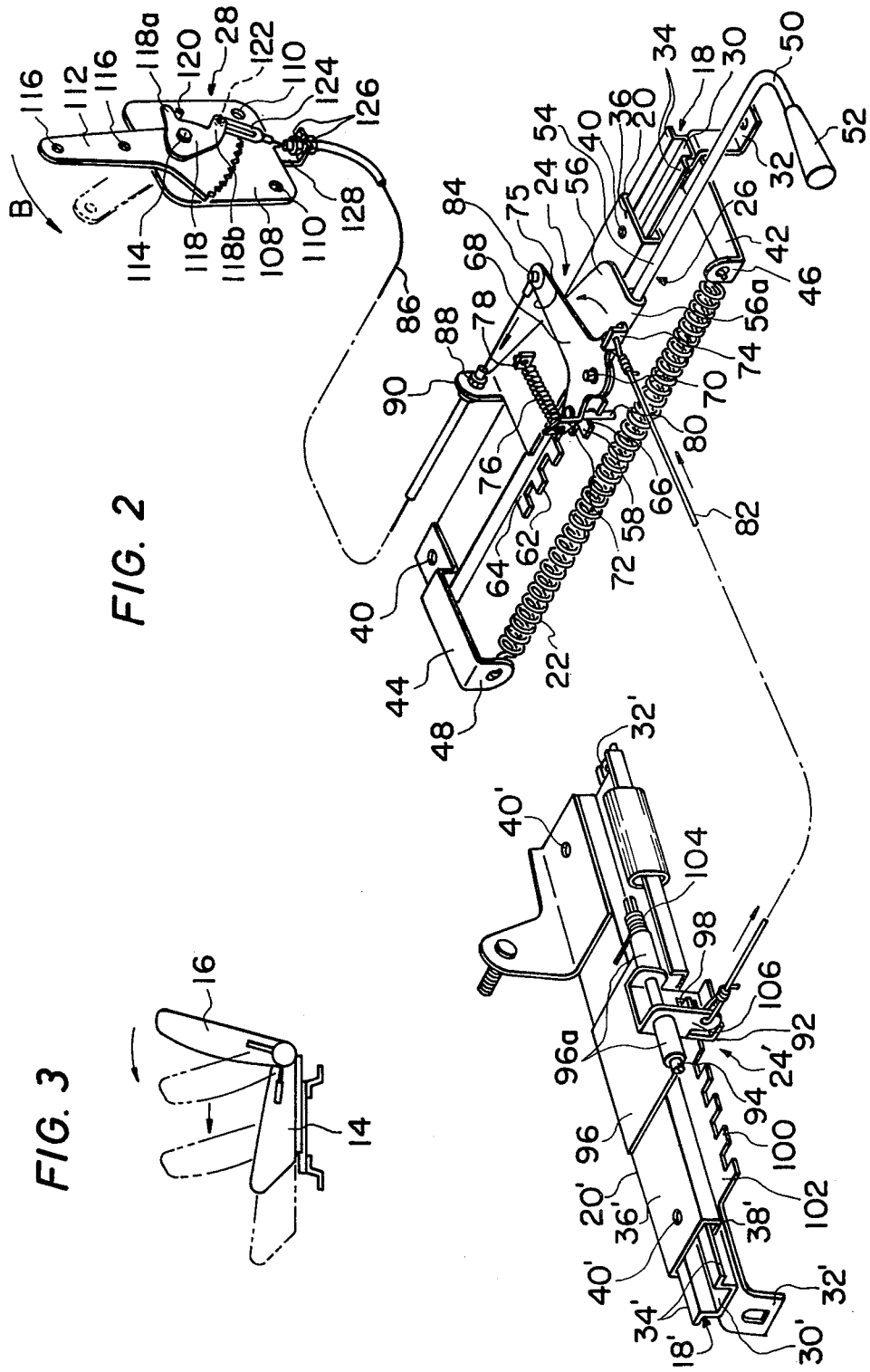

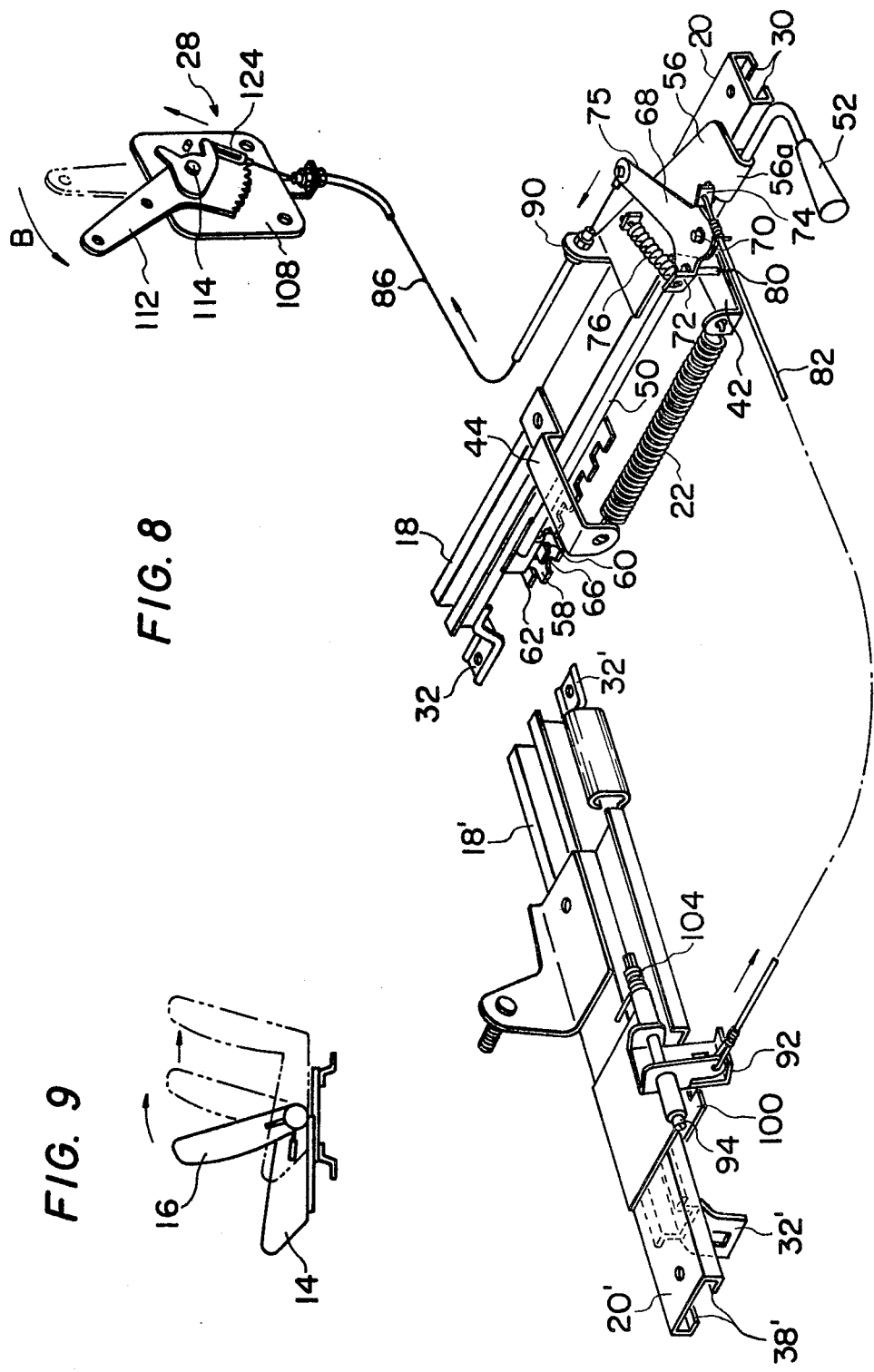

ADJUSTABLE SEAT FOR A MOTOR VEHICLE

BACKGROUND OF THE INVENTION

The present invention relates in general to a seat structure for a vehicle and more particularly to a front seat structure for a two-door type motor vehicle which structure can prepare sufficient foot space behind it when ingress and egress of the rearseat passengers are required.

In this specification, the terms "forward" and "backward" are to be understood as referring to "in the direction of the front of a vehicle in which the seat structure is adapted to be mounted" and "in the direction of the rear of the vehicle in which the seat is adapted to be mounted", respectively.

Some of the two-door type motor vehicles are equipped with such front seat structures as a type in which the entire seat is adjustable in fore-and-aft directions and the seat back of the seat is tiltable forward and backward relative to the seat cushion of the seat. This construction of the front seat structure is considerably advantageous to permit an easy ingress and egress of the rear-seat passengers because sufficient foot space for the rear-seat passengers can be provided behind the seat structure when the entire seat is moved forward tilting the seat back forward. However in a conventional case, the adjustment of the seat structure in fore-and-aft directions is required every time the ingress and egress of the rear-seat passengers is permitted. This is very troublesome to the passenger sitting on the subject seat.

SUMMARY OF THE INVENTION

Accordingly, to eliminate the above-mentioned drawback encountered in the conventional seat structure is a main purpose of the present invention.

An object of the present invention to provide an improved adjustable seat structure which is equipped with a so-called "seat position memorizing means" by which the seat structure is automatically locked to its initially setting position when the entire seat is forced to move toward its normally functioning position after permitting the easy ingress and egress of the rear-seat passengers.

Another object of the present invention to provide an improved adjustable seat structure equipped with biasing means by which the entire seat is automatically moved forward when seat locking is cancelled.

Still another object of the present invention to provide an improved adjustable seat structure equipped with seat locking means which is incorporated with tilting movements of the seat back in such a manner that when the seat back is tilted forward at a predetermined angle, the seat locking means is disengaged.

According to the present invention, there is provided a seat structure for a motor vehicle, having a stationary base member adapted to be fixed to the vehicle, a movable support member slidable on the stationary base member for carrying a seat cushion, and tilting means for allowing a seat back tiltable relative to the seat cushion, the seat structure comprising: seat position memorizing means for memorizing the seat position which is initially set at will in fore-and-aft direction of the vehicle; seat locking means for locking the movable support member to the stationary base member; biasing means for moving the movable support member in the forward direction of the vehicle relative to the stationary base member when the locking means is disengaged; and actuating means for actuating the seat locking means in response to the tilting movements of the seat back and including a lever rotatably supported on the movable support member and biased in one direction by a spring, first means for converting the tilting movement of the seat back to the rotational movement of the lever, second means for transmitting the movement of the lever to the seat locking means so as to allow the seat locking means to be disengaged when the lever is rotated in another direction against the biasing force of the spring in response to the forward tilting movement of the seat back, and third means for causing the lever to rotate in the one direction at a predetermined angle by the assistance of the force of the spring to allow the seat locking means to be engaged when the movable support is located in the memorized seat position initially set.

BRIEF DESCRIPTION OF THE DRAWINGS

Other objects and advantages of the present invention will become more apparent from the following detailed description when taken in conjunction with the accompanying drawings, in which:

FIG. 2 is a fragmentary perspective view of a preferred embodiment of an adjustable support structure incorporated with a transmission mechanism which are employed in the seat structure of the present invention;

FIG. 3 shows by real lines the entire seat structure of the invention in a case that it is set or locked at its normally functioning position;

FIG. 8 is a view similar to FIG. 2 but shows a condition in which the adjustable support structure is partially unlocked; and FIG. 9 shows by real lines the entire seat structure of the invention in a case that the structure is moved forwardly with the seat back forwardly tilted to provide a sufficient foot space behind the structure.

DESCRIPTION OF THE INVENTION

Figure 1:
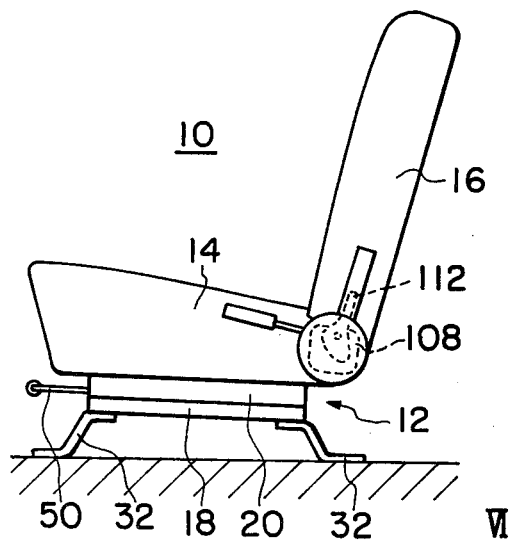
FIG. 1 is a schematic side view of an entire seat structure according to the present invention.

Referring to FIG. 1 of the drawings, there is illustrated a seat structure 10 as including an adjustable support structure, generally designated by the numeral 12, according to the present invention. The seat unit (no numeral) illustrated is of a usual bracket type having a seat cushion 14 and a seat back 16 and is mounted on the adjustable support structure 12 so that the seat unit is movable in fore-and-aft directions and the seat back 16 is tiltable forward to permit access to the space behind the seat unit.

In FIG. 2, the detailed construction of the adjustable support structure 12 is shown as generally comprising a pair of stationary base members 18 and 18' which are fixed to a floor panel (not shown) of a motor vehicle in laterally spaced and parallel relation (though not so illustrated) to extend upwardly from the floor panel beneath the different seat ends in fore-and-aft relation thereto, a pair of movable support members 20 and 20' slidable carried on the respective stationary base members 18 and 18' for fore-and-aft adjustments therealong, and fixedly mounted thereon frame structures (not shown) for the seat unit, biasing means 22 operatively interposed between one of the stationary base members 18 and corresponding movable support member 20 for constantly biasing the movable support member in the forward direction of the seat unit, a latch mechanism 24 (24') selectively releasable to cause the movable support members 20 and 20' to automatically move in the forward direction by the force of the biasing means 22, a seat position memorizing mechanism 26 incorporated with the latch mechanism 24 to cause the movable support members 20 and 20' thus the seat unit, to be locked to its initially set portion when the seat is moved back, and a transmission mechanism 28 for transmitting the tilting movements of the seat back 16 to the latch mechanisms 24 and 24'.

Each of the stationary base members 18 and 18' is formed into channel shape and provided with a bottom 30 (30') fixedly secured to the floor panel (not shown) of the motor vehicle by means of a pair of mounting members 32 (32'). Each base member 18 or 18' also has a pair of flanges 34 or 34' which extends laterally outwardly to provide a horizontal bearing surface on which corresponding movable support member 20 or 20' is slidably carried.

Likewise, each of the movable support members 20 and 20' is formed into channel shape and provided with a top portion 36 or 36' which is carried on the flanges 34 or 34' of the stationary base member 18 or 18'. Each support member 20 or 20' also has a pair of flanges 38 or 38' which extends laterally inwardly to enclose the flanges 34 or 34' of the base member 18 or 18'. A pair of openings 40 or 40' are formed in the top portion 36 or 36' of the movable support member 20 or 20' for easy mounting of the frame structure of the seat unit onto the movable support members 20 and 20'.

As discussed hereinabove, the seat unit thus mounted on the movable support members 20 and 20' is constantly biased in a forward direction by the action of the biasing means 22. The biasing means 22 may be a spiral tension spring which is connected between the stationary base member 18 and the movable support member 20. To this end, a pair of elongate flat members 42 and 44 are provided which are welded or otherwise secured to the stationary base member 18 and the movable support member 20, respectively, as shown. The flat member 42 has an upwardly extending flange portion 46 formed with an opening (no numeral) in which one end of the coil spring 22 is hooked, while the flat member 44 has a downwardly extending flange portion 48 with an opening (no numeral) to which the other end of the coil spring 22 is hooked.

It should be noted that in the embodiment of FIG. 2, the biasing means 22 is shown as mounted on the left-hand mounting structure, but it may be alternatively mounted on the right-hand mounting structure.

For the sake of clear understanding of the mutual relationship between the latch mechanism 24 (24') and the seat position memorizing mechanism 26, an explanation of the seat position memorizing mechanism 26 will be made before that of the latch mechanism 24 (24').

Figure 5:
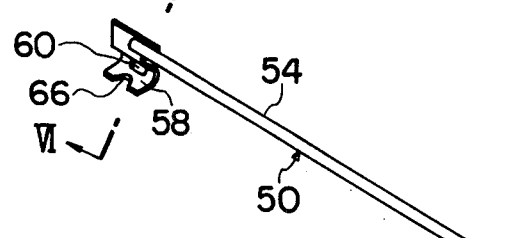
Figure 7:
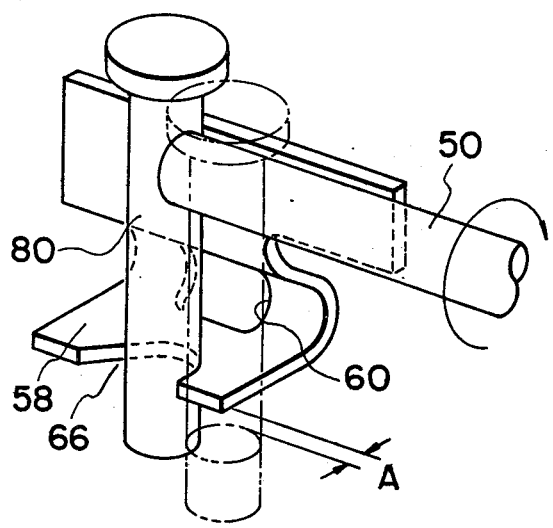
Figure 6:
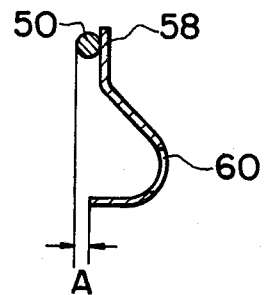

The seat position memorizing mechanism 26 comprises a control lever 50 having a gripping handle 52 at its one end portion. The control lever 50 is longitudinally slidably received at its shaft section 54 in a rounded portion 56a of a bracket 56, which is connected to the movable support member 20 by welding or any other fastening technic. As clearly seen from FIG. 8, a locking plate 58 having a generally inverted C-shaped cross section is connected to the other end portion of the control lever 50 by welding. The locking plate 58 is formed at its curved section an opening 60 which is engageable with a selected one of a plurality of latch lugs or detents 62 formed in a flat plate 64. In FIG. 2, the flat plate 64 is shown as integral with the stationary base member 18, however the flat plate 64 may alternatively be formed as a separate member which is welded to the bottom 30 of the stationary base member 18. In FIG. 5, the detailed construction of the control lever 50 equipped with the gripping handle 52 and the locking plate 58 is clearly shown. The locking plate 58 has also a latch slot 66 at its leading end portion, as clearly seen from FIG. 5, for the purpose to be described hereinlater in detail. Now, it should be noted that, as well shown in FIGS. 6 and 7, the connection between the locking plate 58 and the control lever 50 is so made to provide a distance "A" between the laterally extending top portion of the locking plate 58 and an imaginary plane contacting the outermost surface of the control lever 50 while vertically extending downwardly. The reason why such distance "A" must be prepared will be apparent hereinlater.

With the construction of the seat position memorizing mechanism 26, it will be appreciated that the control lever 50 is not moved longitudinally as long as the locking plate 58 is engaged one of the detents 62 of the flat plate 64, even when the bracket 56 moves with the movable support member 20 relative to the stationary base member 18.

Referring again to FIG. 2, the latch mechanisms 24 and 24' are shown as generally comprising first and second sections. The first section designated by the numeral 24 is mounted on the left-hand mounting structure, while the second section 24' is mounted on the right-hand mounting structure.

Figure 4:
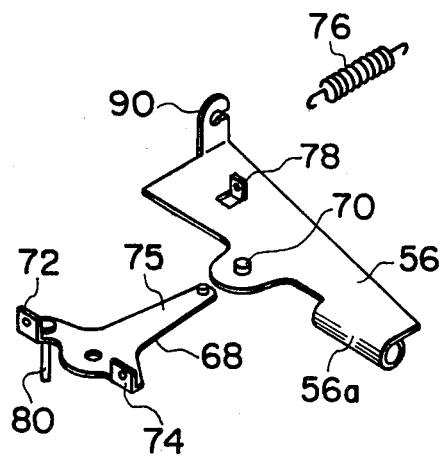
FIGS. 4 to 7 are fragmentary perspective views of several parts which are employed in the adjustable support structure of the seat structure according to the present invention.

The first section 24 of the latch mechanism comprises a generally T-shaped lever member 68 which is pivoted at its one end portion on a pivot pin 70 fixedly mounted on the bracket 56 as well seen from FIG. 4. The lever member 68 has first and second upwardly extending flange portions 72 and 74 which are located opposite to each other with respect to the pivot pin 70. The lever member 68 has further an arm portion 75 which radially outwardly extends from the pivoted portion of the lever member 68. The first upwardly extending flange portion 72 is formed with an opening (no numeral) to which one end of a coil spring 76 is hooked. The other end of the coil spring 76 is hooked to an opening (no numeral) formed in an upwardly extending portion 78 of the bracket 56 so that the lever member 68 is constantly biased clockwise in the drawing (FIG. 2). As well shown in FIG. 4, a stop pin 80 is firmly fixed to the lever member 68 adjacent the first upwardly extending flange portion 72 so as to extend downwardly. The stop pin 80 is releasably engageable to the before-mentioned latch slot 66 of the locking plate 58 in a manner as will be described hereinlater. The second upwardly extending flange portion 74 is also formed with an opening (no numeral) for connection of one end of a wire 82 which leads to the second section 24' of the latch mechanism. The arm portion 75 has at its leading end a connector 84 for a wire 86 leading to the transmission mechanism 28. As shown, the wire 86 is slidably received in a guide member 88 coupled into a cut (no numeral) formed in an upwardly extending flange portion 90 of the bracket 56.

The second section 24' of the latch mechanism comprises a generally box-shaped locking member 92 fixedly supported by a shaft 94 which is rotatably received at its both end portions in rounded portions 96a of a bracket 96, which is connected to the movable support member 20' by welding or any other fastening technic. The locking member 92 is formed at its bottom portion with an opening 98 which is engageable with a selected one of a plurality of latch lugs or detents 100 formed in a flat plate 102. In the embodiment shown in FIG. 2, the flat plate 102 is shown as integral with the mounting member 32' for the stationary base member 18', however the flat plate 102 may alternately be formed as a separate member which is welded to the stationary base member 18'. A spiral spring 104 is disposed about one end of the shaft 94, and has one end engaging the top portion 36' of the movable support member 20' and the other end engaging the one end of the shaft 94 to bias the shaft 94 and thus the box-shaped locking member 92 in clockwise direction, that is the direction in which the locking member 92 is locked by one of the detents 100 of the flat plate 102. The locking member 92 has a side wall 106 in which an opening (no numeral) is formed for connection of the other end of the before-mentioned wire 82. The connection through the wire 82 between the box-shaped locking member 92 and the T-shaped lever member 68 is so made to induce synchronous motions of 92 and 68. More specifically, the connection is so made that when the lever member 68 is rotated to disengage the stop pin 80 from the latch slot 66 of the locking plate 58, the disengagement of the locking member 92 from the detent 100 is initiated at the same time.

The transmission mechanism 28 comprises a base plate 108 which is fixed to a rear end side face of the seat cushion 14 as is well shown in FIG. 1. Designated by the reference numerals 110 are holes through which bolts are inserted for tight connection between the base plate 108 and the seat cushion 14. An arm 112 is fixedly mounted at its generally intermediate portion to a pin 114 rotatably supported on the base plate 108, and is fixed at its upper end portion to a lower end side face of the seat back 16. Designated by the numerals 116 are holes through which bolts are inserted for tight connection between the arm 112 and the seat back 16. Now it should be noted that the pin 114 is located in a position through which an imaginary axis about which the seat back 16 is tiltable relative to the seat cushion 14 is passed. Mounted on the pin 114 while being spaced apart from a front surface of the arm 112 is a generally C-shaped plate 118 which has a laterally extending tab 118a serving as a stop and has a downwardly extending portion 118b. The tab 118a is engageable with a stop pin 120 extending from the base plate 108, during the clockwise rotation of the arm 112 about the pin 114. On the back surface of the downwardly extending portion 118b is fixed with a connecting pin 122 which reaches at its leading end to the front surface of the arm 112. An elongate ring member 124 is loosely engaged with the connecting pin 122. A longitudinal lower end of the ring member 124 is fixed to the other end of the before-mentioned wire 86 leading to the T-shaped lever member 68 of the latch mechanism 24. As shown, the wire 86 is slidably received in a guide member 126 fixed to a flange 128 of the base plate 108. With this, it will be appreciated that the connection between the ring member 124 and the T-shaped lever member 68 through the wire 86 is so arranged that when the arm 122 is tilted forwardly, as indicated by an arrow B, at a predetermined angle by the forward tilting movement of the seat back 16 relative to the seat cushion 14, the stop pin 80 of the T-shaped lever member 68 is caused to disengage from the latch slot 66 of the locking plate 58. Thus, the forward tilting movement of the arm 112 over the predetermined angle induces not only the disengagement of the stop pin 80 from the latch slot 66 but also that of the locking member 92 from the detent 100 (the second section 24' of the latch mechanism).

It is to be noted that by changing the mutual angular position between the arm 112 and the generally C-shaped plate 118, the time instant at which the disengagement operation of the latch mechanisms 24 and 24' take place due to the forward tilting movement of the seat back 16 can be appropriately adjusted.

Before entering into detail discussion of operation of the adjustable support structure 12, let it be assumed that the seat back 16 rests in its normally forwardly facing position as indicated by real lines of FIG. 3 and simultaneously, the locking engagement of the locking plate 58 with the detent 62, the engagement of the stop pin 80 of the first section 24 with the latch slot 66, and the locking engagement of the locking member 92 of the second section 24' with the detent 100 take place as seen from FIG. 2.

When, now, the seat back 16 is tilted forward or in a counterlockwise direction through an arc exceeding the predetermined angle B, the arm 112 of the transmission mechanism 28 rotates to pull the wire 86 against the force of the springs 76 and 104 set in the latch mechanism 24 and 24' thereby causing disengagements of the stop pin 80 of the T-shaped lever member 68 from the latch slot 66 of the locking plate 58 as well as that of the locking member 92 from the detent 100. Under this circumstance, the movable parts such as the movable support member 20 together with the other movable support member 20' are forced to move in a forward direction by the action of the spring 22 until a portion of the movable support member abuts a stop member (not shown) fixed to some stationary parts of the vehicle. Thus, the seat until is automatically held in a forward position to permit easy ingress and egress of the rear-seat passengers.

When, then, the seat back 16 is pivoted back to its normal position while forcing the seat cushion backward, the movable parts such as the movable support members 20 and 20' are moved backwards against the force of the spring 22. During this backward movement of the movable parts, the stop pin 80 of the latch mechanism 24 slides on the side of the shaft section 54 of the control lever 50 while maintaining the disengagement of the box-shaped locking member 92 from the detent 100 of the second section 24' of the latch mechanism. When the stop pin 80 is moved with the backward movement of the movable parts into a position to fall in a trapping portion (no numeral) defined by the leading end of the control lever 50 and the upper section of the locking plate 58, the stop pin 80 falls in the latch slot 66 of the locking plate 58 by the action of the coil spring 76. Simultaneously, the box-shaped locking member 92 is caused to engage corresponding one of the detents 100. Accordingly, the adjustable support structure 12 is held in a locked condition. Now, it should be noted that since the locking plate 58 has already engaged one of the detents 62 of the flat plate 64 by the operation of the control lever 50, the seat unit is automatically locked in its initially set position without requiring any difficult steps.

When, under this circumstance, the fore-and-aft adjustment of the seat unit is required, the gripping handle 52 of the control lever 50 is rotated clockwise of the drawing (FIG. 2) at a predetermined angle. By this rotation of the gripping handle 52, the locking plate 58 is caused to disengage from the associated detent 62 of the flat plate 64 while pushing the stop pin 80 laterally to rotate the T-shaped lever member 68 counterclockwise in FIG. 2. Thus, the box-shaped locking member 92 is disengaged from the corresponding detent 100 by the pulling action of the wire 82 leading to the T-shaped lever member 68. These movements are made against the force of the coil spring 76 of the T-shaped lever member 68 and the spiral spring 104 of the box-shaped locking member 92. Thus, the movable parts of the adjustable support structure 12 are freely movable between fore-and-aft positions although some forward force is applied to the movable parts by the spring 22. Thus, the seat unit is readily set in a desired position and locked in this position by rotating the gripping handle 52 clockwise to achieve engagement of the locking plate 58 with one of the detents 62 of the flat plate 64. Of course, in this condition, the box-shaped locking member 92 has been brought into engagement with corresponding detent 100 of the flat plate 102.

Now, it should be noted that because of the loose connection between the elongate ring member 124 and the connecting pin 122 which are the parts of the transmission mechanism 28, the wire 86 connecting the transmission mechanism 28 to the T-shaped lever member 68 will not be abnormally bent even when the wire 86 is forced to transfer toward the transmission mechanism 28 by the backward tilting movement of the seat back 16 and the clockwise rotation of the gripping handle 52.

From the above, it will be appreciated that by the present invention, not only ingress and egress of the rear-seat passengers in a two-door vehicle can be achieved but also the seat position setting after the forward movements of the seat unit can be automatically made without requiring any difficult steps.

It should be noted that the foregoing description shows only an exemplary embodiment. Various modifications are apparent to those skilled in the art without departing from the scope of the present invention which is only limited by the appended claims.

What is claimed is:

1. A seat structure for a motor vehicle, having a stationary base member adapted to be fixed to said vehicle, a movable support member slidable on said stationary base member for carrying a seat cushion, and a tilting means for allowing a seat back to be tilted relative to said seat cushion, said seat structure comprising:
   seat position memorizing means for memorizing the seat position which is initially set at will in fore-and-aft direction of said vehicle and including a plurality of detents fixed to said stationary base member, a control lever connected to said movable support member so as to be rotatable about the axis thereof and longitudinally movable relative to said movable support member, and a plate member firmly fixed to one end of said control lever and having an opening therein for engagement with one of said detents when said control lever is rotated about the axis thereof in one direction at a predetermined angle, said plate member being formed with a latch slot at its side portion;
   seat locking means for locking said movable support member to said stationary base member;
   biasing means for moving said movable support member in the forward direction of said vehicle relative to said stationary base member when said locking means is disengaged; and
   actuating means for actuating said seat locking means in association with said seat position memorizing means in response to the tilting movement of said seat back and including a lever member rotatably supported on said movable support member and biased one direction by a spring; a pin member firmly fixed to one end of said lever member, said pin member being engageable with said latch slot of said plate member of said seat position memorizing means to allow said lever member to rotate in said one direction at a predetermined angle by the assistance of said spring, first means for converting the tilting movement of said seat back to the rotational movement of said lever member so that when said seat back is tilted forwardly at a predetermined angle, said lever member is rotated in another direction against the force of said spring thus causing said pin member to disengage from said latch slot, and second means for transmitting the movement of said lever member to said locking means so that when said pin member is disengaged from said latch slot, said seat locking means is disengaged thus causing said movable support member to move in the forward direction by force of said biasing means.

2. A seat structure as claimed in claim 1, in which said control lever of said seat position memorizing means is slidably and rotatably received at its shaft section in a rounded portion of a bracket, said bracket being firmly connected to said movable support member.

3. A seat structure as claimed in claim 1, in which said plate member of said seat position memorizing means has a generally inverted C-shaped cross section and has said opening at its curved section.

4. A seat structure as claimed in claim 2, in which said lever member of said actuating means is pivotally mounted on said bracket and has three radially outwardly extending portions about the pivoted portion thereof which portions are respectively connected to said pin member, said first and said second means.

5. A seat structure as claimed in claim 1, in which said pin member of said actuating means is slidable on said control lever for maintaining said lever member in a condition wherein said seat locking means is disengaged.

6. A seat structure as claimed in claim 5, in which the one end of said control lever and said plate member of said seat position memorizing means form therebetween a trapping portion into which said pin member falls after sliding on said control lever so that said pin member is brought into engagement with said latch slot of said plate member.

7. A seat structure for a motor vehicle, having a stationary base member adapted to be fixed to said vehicle, a movable support member slidable on said stationary base member for carrying a seat cushion, tilting means for allowing a seat back to be tilted relative to said seat cushion, said seat structure comprising:
   seat position memorizing means for memorizing the position of said movable support member relative to said stationary base member in fore-and-aft direction of said vehicle, said memorizing means including a plate member supported on said movable support member and lockable relative to said stationary base member for memorization of the seat position;
   seat locking means for locking said movable support member to said stationary base member;

biasing means for biasing said movable support member in the forward direction of said vehicle such that said movable support member is moved forwardly relative to said stationary base member when said locking means is in its inoperative condition; and actuating means for actuating said seat locking means in response to the tilting movement of said seat back, said actuating means including:

a lever rotatably supported on said movable support member and biased to rotate in one direction by a spring;

first means for converting the tilting movement of said seat back to the rotating movement of said lever such that said lever is rotated in another direction against the biasing force of said spring when said seat back is tilted forwardly;

second means for transmitting the rotating movement of said lever to said seat locking means so as to allow said seat locking means to become inoperative when said lever is rotated in said another direction; and third means for allowing said lever to rotate in said one direction at a predetermined angle by the assistance of the biasing force of said spring causing said seat locking means to become operative when said movable support member is located in the memorized position thereof, said third means including a pin member fixed to said lever, and a latch slot formed in said plate member of said seat position memorizing means, said pin member being lockably received in said latch slot when said movable support member is located in the memorized position, said lever having three radially outwardly extending portions about the pivoted portion thereof, said portions being respectively connected to said pin member, said first means and said second means.

* * * * *